(12) United States Patent
Walthert et al.

(10) Patent No.: US 11,220,133 B2
(45) Date of Patent: Jan. 11, 2022

(54) BICYCLE COMPONENT FOR AN AT LEAST PARTIALLY MUSCLE-POWERED BICYCLE

(71) Applicant: DT SWISS INC., Grand Junction, CO (US)

(72) Inventors: Martin Walthert, Aarberg (CH); Stefan Spahr, Lengnau (CH)

(73) Assignee: DT SWISS INC., Grand Junction, CO (US)

( * ) Notice: Subject to any disclaimer, the term of this patent is extended or adjusted under 35 U.S.C. 154(b) by 187 days.

(21) Appl. No.: 16/503,110

(22) Filed: Jul. 3, 2019

(65) Prior Publication Data

US 2020/0009908 A1    Jan. 9, 2020

(30) Foreign Application Priority Data

Jul. 6, 2018    (DE) .......................... 102018116465.3

(51) Int. Cl.
| | |
|---|---|
| *F16D 41/24* | (2006.01) |
| *B60B 27/04* | (2006.01) |
| *B60B 27/02* | (2006.01) |
| *F16D 11/14* | (2006.01) |

(52) U.S. Cl.
CPC .......... *B60B 27/047* (2013.01); *B60B 27/023* (2013.01); *F16D 41/24* (2013.01); *F16D 11/14* (2013.01)

(58) Field of Classification Search
CPC ...... B60B 27/047; B60B 27/023; F16D 41/24
See application file for complete search history.

(56) References Cited

U.S. PATENT DOCUMENTS

| | | | |
|---|---|---|---|
| 5,676,227 A | 10/1997 | Hügi | |
| 6,588,564 B1 | 7/2003 | Jäger et al. | |
| 8,936,144 B2 | 1/2015 | Spahr et al. | |
| 2013/0092496 A1 | 4/2013 | Tho | |
| 2013/0105266 A1* | 5/2013 | Spahr | ...................... F16D 41/24 192/46 |
| 2015/0354641 A1 | 12/2015 | Huber | |
| 2017/0045100 A1 | 2/2017 | Tsai | |
| 2018/0029412 A1 | 2/2018 | Walthert et al. | |

FOREIGN PATENT DOCUMENTS

DE    102004004961 B4    3/2006

OTHER PUBLICATIONS

European Search Report for European Patent Application No. 19184663, dated Oct. 31, 2019.
German Search Report from corresponding German Patent Application No. 102018116465.3, dated Feb. 11, 2019.

* cited by examiner

*Primary Examiner* — Huan Le

(74) *Attorney, Agent, or Firm* — Greer, Burns & Crain, Ltd.

(57) ABSTRACT

A bicycle component for an at least partially muscle-powered bicycle with at least one freewheel unit including a freewheel component and a support unit and a spring unit, the freewheel component containing a tubular body section extending around a central axis and configured hollow showing a non-round outer contour for non-rotatable and axially displaceable coupling and a front surface with axial engagement components. The spring unit urges the freewheel component and the support unit apart in an axial direction of the central axis. The freewheel component, the support unit, and the spring unit form an assembly suitable for pre-assembly, and the spring unit is attached to the freewheel component and the support unit.

31 Claims, 5 Drawing Sheets

BICYCLE COMPONENT FOR AN AT LEAST PARTIALLY MUSCLE-POWERED BICYCLE

BACKGROUND

The present invention relates to a bicycle component for an at least partially muscle-powered bicycle, and comprises at least one freewheel unit which comprises a freewheel component and a spring unit. In simple cases, the bicycle component is configured as a freewheel unit. In more complex cases, the bicycle component may also comprise a complete freewheel, or may for example be configured as a hub. Use of the invention is also possible in a bottom bracket or other drive components of bicycles to which for example an electric auxiliary motor is coupled via a freewheel device.

Although the invention will now be described with reference to use in a bicycle, the bicycle component according to the invention may also be employed in other, partially muscle-powered vehicles and bi- or multicycles comprising, for example, an electric auxiliary drive. The bicycle component is in particular employed in sporty and preferably semiprofessional and/or professional bicycle components and bicycles. In all the configurations, the bicycle component according to the invention is employed in the kinds of vehicles, and in particular bicycles which in normal and regular use as intended are driven at least partially or in particular also entirely by the user's muscular energy.

The prior art has disclosed various hubs for bicycles comprising a freewheel so that the pedal crank will not keep rotating along, for example during a downhill ride. This freewheel also allows contrarotating of the hub shell versus the rotor in backpedaling.

The prior art has disclosed hubs with ratchet freewheels where the pawls can radially pivot between a freewheel position and an engagement position. These hubs are provided with different numbers of ratchet pawls and tend to show four ratchet pawls symmetrically distributed over the circumference. As force is transmitted, the ratchet pawls engage a toothing in the rotor. The relatively low number of ratchet pawls results in a relatively large angle of rotation until rotational force is transmitted when pedaling is resumed.

DE 94 19 357 U1 has disclosed a hub with a toothed disk freewheel which reliably and very quickly transmits the driving force from the rotor to the hub shell while otherwise, friction losses are relatively low while the user is not actuating the pedals. A toothed disk freewheel has many advantages and allows a particularly fast response of the freewheel. In this freewheel, a pair of toothed disks transmits forward rotational force of the rotor while in backpedaling, the teeth disengage axially. The known hub with the known freewheel functions per se satisfactorily and is used in the area of sports and also in professional riding. However, there is the disadvantage that the high loads acting on the hub, for example in uphill rides, may generate bending moments in the hub so as to cause the toothed disk to slightly tilt, which results in higher wear on the teeth which are subjected to higher forces so that durability is limited and the toothed disks require early replacement to avoid malfunction.

EP 1 121 255 B1 has disclosed a lightweight hub having a toothed disk freewheel and showing reliable function, wherein the teeth of the toothed disks are stressed more evenly. This hub uses a pair of toothed disks, both of which are axially movable and are axially urged toward one another from the outside by means of a spring. The two toothed disks are thus floatingly supported, and for example in case of the hub flexing or given other types of stresses, they may show better positioning to one another so as to provide more even wear on the toothed disks and a particularly reliable operation.

Such a hub is readily demounted for maintenance purposes. However, demounting, cleaning and subsequent mounting may, due to the relatively complex structure, involve loss or incorrect mounting of some parts.

SUMMARY

It is therefore the object of the present invention to provide a bicycle component for an at least partially muscle-powered bicycle showing improved properties and in particular a simpler structure.

A bicycle component according to the invention for an at least partially muscle-powered bicycle comprises at least one freewheel unit which comprises a freewheel component, a support unit and at least one spring unit. The freewheel component comprises a tubular body section extending around a central axis and configured hollow, showing a non-round outer contour for non-rotatable and axially displaceable coupling, and a front surface with axial engagement components. The spring unit urges the freewheel component apart in an axial direction of the central axis. The freewheel component, the support unit and the spring unit form an assembly suitable for pre-assembly and preferably preassembled and the spring unit is attached to the freewheel component and the spring unit is attached to the support unit.

The bicycle component according to the invention has many advantages. A considerable advantage consists in that the freewheel component, the support unit and the spring unit form one joined assembly extending around the central axis, which forms an axis of symmetry. The spring unit is configured for biasing the freewheel component in an axial direction of the central axis and is connected with, and in particular immediately attached to, the freewheel component and the support unit. The assembly consisting of the freewheel component and the spring unit and the support unit may be preassembled and thus allows more constant operating conditions, even if a hub of a bicycle equipped with such an assembly is disassembled and then reassembled. An improved observation of tolerances can also be ensured in the initial assembly or in maintenance, thus enabling a still better function.

The assembly is small and compact in structure, requiring just minimal axial mounting space. The spring unit is in particular (preferably axially entirely) accommodated between the freewheel component and the support unit.

On the axially inside surface, the support unit provides a defined supporting surface for the spring unit. On the axially outside surface, the support unit provides a defined stop face for the entire freewheel unit.

Mounting a freewheel unit in a hub is facilitated since the assembly is inserted in its entirety in mounting. This allows prevention of mounting errors, for example by inexperienced users who will only rarely disassemble and reassemble a hub. A consistently high quality can be achieved.

Preferably the freewheel component is configured with at least one accommodation section. Preferably the spring unit is attached to the accommodation section. The spring unit is, in particular accommodated on the freewheel component in a force fit and/or form fit. The accommodation section of the freewheel component may, in particular be configured as a fixing section, or the freewheel component comprises a fixing section. Particularly preferably, the spring unit is secured to the freewheel component and in particular to the fixing section of the freewheel component secure against loss.

Preferably, at least one support section is configured on the support unit. Preferably, the spring unit is attached to the support section. The spring unit is in particular accommodated on the support unit in a force fit and/or form fit. Particularly preferably, the spring unit is secured to the support unit, and in particular to the support section of the support unit secure against loss. Then, the support section is configured as, and may be denoted, a holding section.

Preferably, the spring unit is detachably connected with the freewheel component and/or the support unit to allow, for example separate cleaning or separate exchanging of the spring unit. The spring unit may, in particular be manually separated from, and reconnected with, the freewheel component and/or the support unit, no tools required.

A freewheel component comprises the tubular body section and axial engagement components on an axially outside surface on a front surface of the freewheel component. In preferred configurations, the axial engagement components form an axial toothing.

The front surface may be oriented perpendicular to the central axis and thus perpendicular to the axis of symmetry of the freewheel unit. Alternatively, it is possible for the front surface of the freewheel component to be oriented at an acute or obtuse angle to the central axis and for example to be conical or frusto-conical in configuration.

The freewheel component may be configured integrally. Alternatively, it is possible for the freewheel component to consist of two or more different components and/or materials fixedly connected with one another.

The number of engagement components or teeth on the front surface of the freewheel component is preferably larger than two, and in particular larger than ten. Preferably, the number of engagement components is between 15 and 90 although it may be higher. In preferred configurations, 18, 24, 36, 48, 54 or 72 engagement components are employed. The larger the number of engagement components, the smaller is as a rule the required angle of rotation to reestablish the engaged state when resuming pedaling from the freewheeling state. Moreover, the number of engagement components reduces the required axial path which the freewheel unit must travel in the axial direction to cause the freewheel unit to engage with, or disengage from, another freewheel unit. The required axial travel is reduced because the surface required due to the admissible surface pressure is obtained with a lower tooth height.

In all the configurations, the support unit preferably comprises an annular and/or disk-shaped body section such as a support disk on which the spring unit is supported. The support unit comprises in particular a completely circumferential supporting surface. Alternatively, it is possible for the support unit or an annular and/or disk-shaped body section of the support unit to not extend completely around the central axis but only around the majority, e.g. at least 60% or 75% or 90%. The body section may also show one or more (narrow or wide) slits. It is essential for the support unit to enable a permanently defined support of the spring unit and a permanently defined support of the entire assembly e.g. in a hub.

Preferably, the defined supporting surface for the spring unit is configured on the axially inside surface of the disk-shaped body section. The axially outside surface of the disk-shaped body section shows, in particular a defined stop face to place the entire freewheel unit in a defined position for example in a hub.

Particularly preferably, the spring unit is axially disposed between the freewheel component and the support unit. The spring unit is preferably supported by its first end on the freewheel component and by a second end, on the support unit. The spring unit is in particular received axially (entirely) between the freewheel component and the support unit.

The assembly may be very compact and requires little mounting space, for example in a bicycle hub. This allows achievement of a compact structure of the entire hub, achieving higher engineering strength and lower weight of the hub. Generally, it is possible for the mounting length in the axial direction to be just a little longer than the axial length of the freewheel component. It is even possible for the axial length of the assembly to equal the axial length of the freewheel component.

An assembly consisting of a freewheel component, a spring unit and a support unit allows ease of mounting to a hub, since the preassembled assembly only needs to be inserted in the hub provided for mounting. A preassembled assembly also considerably reduces the risk of losing or incorrectly inserting components during mounting. Incorrect orientation may already result in malfunction. The preassembled assembly prohibits any incorrect orientation of the spring unit and the support unit. Mounting the modular unit to a hub is virtually possible in one orientation only which reduces errors.

An assembly offers the advantage, not only in initial mounting but also following maintenance, of inserting the preassembled freewheel unit as one assembly into a hub or another drive component. As a rule, the individual components of the assembly do not simply fall apart during mounting. Particularly preferably, the complete freewheel unit can be removed as one assembly from a hub or another drive component e.g. for dismantling and servicing the hub. This applies in particular following extended intense operation as intended.

In particular, in individual cases it may happen that e.g. during or after demounting the individual components of the freewheel unit do not sufficiently adhere to one another and become separated.

Better coherence may be further achieved by adding the required lubricant or grease. Thus, a certain amount of grease as a rule reliably holds e.g. the individual components together during mounting even if tolerances between the components are less than optimal. It is possible and preferred for a lubricant such as grease to at least contribute to fastening the spring unit to the freewheel component and/or the support unit. It is also possible for a clot of the lubricant to completely provide a hold at least during mounting.

Later, the lubricant will automatically distribute in operation.

After mounting an assembly, the individual components, particularly preferably continue to stick to one another more than 75%, and in particular more than 90%, and preferably more than 99% in a force-fit and/or form-fit. In operation or following extended operation, the individual parts of the assembly may separate from one another so that the spring unit or the support unit may have to be removed individually. Even in this case the bicycle component according to the invention offers the advantage that during the subsequent mounting the assembly can be preassembled and holds together automatically or e.g. due to the lubricant at least for mounting. This largely avoids incorrect mounting even if inexperienced users carry out the mounting.

Preferably, the stroke length of the spring unit is less than 15 mm and in particular less than 10 mm. In actual operation in a hub, as the bicycle component the stroke length is preferably less than 6 mm or 5 mm, or in particular less than 2 mm. Particularly preferably, the stroke length in operation is less than 1.5 mm. A stroke length is understood to mean a feasible axial movement as the spring unit axially compresses. The stroke length is in particular understood to mean a feasible compression and axial movability in the direction of compression of the support unit and the freewheel component relative to one another.

The free axial distance of the support unit to the freewheel component in the unloaded state is preferably less than 8 mm, and in particular less than 6 mm, and preferably less than 5 mm. A stroke length in the unloaded state of 4 mm or less is also possible. The free axial distance of the support unit from the freewheel component in the unloaded state is understood to mean a distance which both parts can travel toward one another before the support unit and the freewheel component go into lockout.

Preferably the free axial distance of the support unit from the freewheel component in a typical mounted state, e.g. in a hub is less than 5 mm, and in particular less than 3 mm, and preferably less than 2 mm and it may in particular be less than 1.5 mm. In a concrete configuration, the free axial distance in the installed state is less than 1.1 mm. The required axial stroke length for disengaging the axial engagement components in the concrete example is less than 0.75 mm. The free axial distance of the support unit from the freewheel component in the installed state depends on the axial height of the engagement components (tooth height), and in particular also on the quantity of engagement components (teeth).

The axial height of the axial engagement components in a concrete configuration is less than 0.7 mm. The concrete height also depends on the quantity of engagement components. A multitude of engagement components in particular show an annular arrangement. It is possible to provide engagement components disposed in two or more concentric rings.

In the peripheral direction, the engagement components and teeth are preferably arranged in series. Alternatively, it is possible for some engagement components to be missing over the circumference.

For example, every one in four or five engagement components may be absent and a smooth surface be provided instead. Such a freewheel unit is likewise functional.

Preferably, the diameter of the assembly transverse to the central axis is more than 24 mm or 25 mm. The concrete diameter depends on the application and may be 28 mm or 30 mm. At any rate, the diameter is preferably less than 60 mm and in particular less than 40 mm.

Preferably, the freewheel component comprises a supporting surface configured transverse to the tubular body section for supporting the spring unit. The supporting surface is in particular configured on a wall of the freewheel component protruding radially inwardly. The supporting surface may be configured on the axially inside surface of the front face. Alternatively, it is possible for the supporting surface to be configured on an annular wall spaced apart from the front face. For example, the annular wall may be configured in parallel to the front face so as to show a cross-section that is U-shaped in the radial direction in the area of the annular wall and the front face. It is possible for the front face and such an annular wall to be configured on the opposite ends of the freewheel component or spaced apart therefrom. Then, the freewheel component shows a U-shaped cross-section with the two legs of the "U" facing radially inwardly. A hollow space may be formed in the axial direction between the annular wall and the front face. Alternatively, it is possible for the front face and the annular wall to merge into one another and thus to form a solid freewheel component provided with a central e.g. cylindrical passage to push a hub axle through. The annular wall may be circumferential but it may be formed by two or more radially inwardly protruding separate segments.

Preferably, the accommodation section is configured on at least one axial takeup tab. The takeup tab extends in parallel to the central axis, in particular in the axial direction. The takeup tab may be annular in configuration and may extend around the central axis. It is also possible and preferred for the takeup tab to be configured on a conical surface or to be frusto-conical in configuration. It is also possible that an attachment depression is configured on the takeup tab. When the takeup tab is e.g. formed as a circumferential takeup flange, the takeup flange may show a circumferential depression at which one end of the spring unit is received and attached by force fit and/or form fit and in particular secure against loss. A takeup tab consisting of individual accommodating members may show a "circumferential" depression configured correspondingly for attachment of the spring unit by force fit and/or form fit and in particular secure against loss.

An accommodation section serves in particular as a fixing section for fixing the spring unit. A takeup flange is in particular a fixing flange. An accommodating member is in particular a fixing member for fixing the spring unit.

The takeup tab may be tubular, forming an annular flange. Then, the accommodation section is preferably configured on a radially peripheral surface of the annular flange (or the annular wall). The accommodation section may be configured on the radially outwardly peripheral surface or on the radially inwardly peripheral surface of the annular flange.

The takeup tab and/or the annular flange extend in particular in the inside of the tubular body section from the front face rearwardly, while the engagement components are configured on the front axial end on the front surface of the front face.

It is possible and preferred for the accommodation section to comprise multiple part sections on a multitude of takeup tabs or accommodating members. The accommodating members may be configured as separate parts and may, for example, be fixedly accommodated on, and for example clamped to, the freewheel component. It is possible to dispose the entire accommodation section for example in an annular arrangement. It is possible to distribute over the circumference 3, 4, 5, 6 or more accommodating members showing part sections of the accommodation section. This may be realized for example, by way of an annular flange showing periodic recesses or gaps over the circumference. Gaps may be created for example by machining such as milling or the like. In the case of multiple accommodating members, the spring unit may be spot-clamped to a corresponding number of part sections or fixing spots.

These accommodating members may for example be axial pins on the inner front face. It is also possible to configure, or insert, radial pins on respectively into the tubular body section from the inside. It is also possible to insert a separate insert member with axial or radial pins or accommodating members in the freewheel component where it is fixed (e.g. by way of force fit or gluing).

Then, other than the freewheel component of the spring unit and the support unit, the assembly also comprises an insert member with accommodating members or an annular flange or the like.

In preferred specific embodiments, the accommodation section is configured on an inner wall of the tubular body section in a longitudinal section showing a narrower clear diameter to accommodate the spring unit for radially inwardly clamping. In the subsequent longitudinal section, the clear diameter is noticeably larger than is the outer diameter of the spring unit in this area so as to ensure trouble-free function in compressing and relaxing the spring unit. In all the configurations, the spring motion prohibits any contact (of the active section) of the spring unit with the freewheel component outside the accommodation section. A form-fit accommodation of a section of the spring unit on an inner periphery respectively inner wall of the tubular body section is also possible and preferred.

It is possible for the accommodation section to comprise at least one thread groove for screwing the spring unit to the freewheel component. It is possible for the spring unit to be screwed onto or into a thread groove of the freewheel component on the outside or inside respectively. It is also conceivable to screw the spring unit into a thread groove to fix the spring unit to the freewheel component.

In all the configurations, it is preferred for the support unit to comprise a support disk and at least one support tab. The support tab may be configured as a circumferential support flange. The support tab or the support flange may be formed immediately or indirectly on the support disk. The support disk and the support tab are fixedly interconnected, and are in particular configured integral. It is also possible for the support tab and the support disk to be separate, interconnected components. The support tab accommodates the spring unit by force fit and/or form fit and in particular secure against loss.

In the sense of the present application the term "secure against loss" is understood to mean a fastening strength due to which the parts connected secure against loss as a rule do not separate in normal use during mounting, in particular also during demounting and preferably in (normal) operation. At any rate the parts can be separated with tools and preferably manual separation without tools is also possible.

The support disk serves to support the freewheel unit on another part such as a radial shoulder in a hub or on a bearing.

Preferably, the support tab is configured as a support flange and is in particular configured to radially outwardly clamp the spring unit. It is also conceivable for the spring unit to be clamped to, or otherwise fixed at, a radially inwardly peripheral surface or a radially inwardly surface of a support tab or multiple support tabs. Again it is possible for the spring unit to be screwed with the support tab or the support flange or connected in another way.

Preferably, multiple support members are configured in particular on the circumference of the support disk. The support members may be disposed on the circumference in an annular arrangement. The support members may be configured integrally with the support disk. It is also possible for the support members to be separate parts compressed with the support disk.

Particularly preferred is a configuration in which one of the spring unit ends is accommodated radially outwardly on two or more takeup tabs or on a circumferential takeup flange at the freewheel component, and in which the other of the spring unit ends is accommodated radially outwardly on two or more takeup tabs, or on a circumferential takeup flange on the support unit. Such a configuration is very advantageous, since radially inwardly movement of an end or another section of the spring unit is reliably prevented in any operating condition. This allows to reliably prevent that one of the spring unit ends rests on a roller bearing of a hub. Absent such a configuration, it may happen that the spring unit (configured as a coil spring or the like) deflects inwardly if unsuitable conditions occur during mounting, or in operation e.g. caused by an inexperienced user. Defective mounting following maintenance may result in unreliable operation. If the spring unit, e.g. comes to rest on the sealing of a roller bearing after defective mounting, undefined conditions are present under which reliable operation cannot be ensured.

Particularly preferably, an individual spring unit is employed. The spring unit preferably includes a spring body extending around the central axis. The spring body is in particular configured for biasing the freewheel component in the axial direction of the central axis. It is also possible to employ two or more spring units.

The spring unit is preferably configured as a coil spring having at least one coil extending around the central axis. The spring unit may show a frusto-conical configuration.

Preferably, the spring unit is configured in particular as a cylindrical coil spring. This enables reproducible conditions. This also enables a small mounting space. The outer diameter of the spring unit is in particular larger than 15 mm and in particular larger than 20 mm. Preferably the diameter of a coil is between 0.25 mm and 3 mm and in particular between 0.5 mm and 2 mm. The relation of the maximum outer diameter of the spring unit to the diameter of a coil is preferably lower than 50, and in particular higher than 15. The relation is preferably between 20 and 40.

Preferably, the spring unit consists entirely or at least substantially of a metallic material and preferably steel.

It is also possible and preferred for the spring unit to be configured as, or to comprise, a zigzag spring. A zigzag spring may also show one, two or more circumferential coils. It is also possible for the spring unit to comprise two or more coupled or interconnected spring members. It is possible for the spring unit to comprise a pair of coil spring elements rotating in the same sense or in opposite senses. The spring members may be interconnected in intersection points.

In preferred configurations, at least one end of the coil or one of the coil ends of the spring unit is bent radially inwardly and/or outwardly. Bending over one end of the coil of the spring unit allows achievement of a still tighter clamping to the freewheel component and/or the support unit.

It is also possible and preferred for the support unit and the spring unit to show a one-part or integral configuration. An axial end of the spring unit may show an integral transition to, or form, the support unit.

Another bicycle component according to the invention has the object to enable more reliability of mounting, and for example to obtain a hub enabling more reliability of function.

Such a bicycle component according to the invention is provided for an at least partially muscle-powered bicycle. The bicycle component comprises at least one freewheel unit and in simple configurations it is configured as a freewheel unit. The freewheel unit comprises a freewheel component and a spring unit, and a support unit and at least one spring unit supported between the support unit and the freewheel component, or comprises a spring unit urging apart the support unit and the freewheel component in the axial direction of the central axis. The freewheel component comprises a tubular body section extending around a central axis and configured hollow, showing a non-round outer contour for non-rotatable and axially displaceable coupling, and a front surface with axial engagement components. The spring unit comprises a spring body. The spring body extends in particular around the central axis. The support unit includes a safety device extending axially in the direction of the freewheel component and/or the freewheel component includes a protective device extending axially in the direction of the support unit to prevent an end of the spring unit from side-slipping radially inwardly.

Such a bicycle component according to the invention has many advantages. These configurations where structural measures allow prevention of a spring end from side-slipping inwardly allow to avoid malfunction of a hub so equipped. Malfunction may occur e.g. if the freewheel unit is disposed adjacent to a roller bearing or a ball bearing. If, due to clumsy mounting by an inexperienced user, an end of a coil spring is urged radially inwardly, the end of the coil spring may come to rest immediately on the rolling members or on a sealing unit mounted for their protection. Both of the variants cause additional loads on the rolling members, friction increases, and proper operation cannot be ensured. This is reliably prevented by the bicycle component according to the invention.

Both a safety device and/or a protective device reliably prevent e.g. a coil of a coil spring or a part of a spring unit from side-slipping inwardly. This applies both for a spring unit whose spring body extends (completely) around the axis and for multiple small spring units disposed distributed over the circumference and comprising e.g. a thin spring body each.

In preferred specific embodiments, the safety device comprises a support flange or support members on the support unit which prevent an end of the spring unit from side-slipping inwardly. The support flange may be denoted a safety flange. Individual safety or support members may be used in particular for a spring unit extending completely around the axis.

The support flange does not need to permanently support the spring unit. It is sufficient for the support flange to support the spring unit only while the end is moving radially inwardly.

Preferably, the spring unit rests indirectly and preferably immediately on the support flange or the support members.

It is preferred for the protective device to comprise a takeup flange or accommodating members on the freewheel component to prevent an end of the spring unit from side-slipping inwardly. The takeup flange may be denoted a protective flange. The takeup flange does not need to permanently accommodate an end of the spring unit. In the normal operating state, a radial distance may show. It is essential for the pertaining end of the spring unit to be received or supported if, in case of defective mounting or in operation the end of the spring unit moves radially inwardly. This allows reliable prevention of undefined conditions resulting from undefined radial deflecting of the end of the spring unit.

The takeup flange is virtually a protective flange which, however, is not required to always receive or support the spring unit immediately contacting. The takeup flange receives the spring unit or its end and supports the end at any rate in the case that the end is likely to side-slip inwardly.

Preferably, a protective device or a safety device extends over an axial length that is larger than at least one half of a wall thickness of the spring unit. In the case of a coil spring, the axial length of the safety device is preferably dimensioned at least such that the axial length of the safety device is larger than an entire mean diameter of the spring unit wall, or than the diameter adjacent to, or at, the end of the coil of the spring unit. The axial length is, in particular at least 1.25 times or 1.5 times the mean diameter.

Preferably, a circumferential receiving space that is ultimately approximately groove-shaped showing e.g. a U-shaped cross-section is configured between the protective device at the freewheel component and the tubular body section for an end of the spring unit.

It is possible for a free radial distance to be provided between the protective device and the spring unit and/or between the safety device and the spring unit.

Alternatively, it is possible and preferred for one end of the spring unit to rest immediately on the protective device, and/or for the other end, to rest immediately on the safety device. It is also possible and preferred for one end of the spring unit to be connected with, and in particular fastened to, the protective device and/or the other end, directly with respectively to the safety device.

In a preferred specific embodiment of all the configurations described above, the bicycle component comprises a hub shell rotatably supported relative to the hub axle and a rotatably supported rotor. In such a configuration the bicycle component may be configured as a hub. The rotor is configured to accommodate at least one sprocket and in particular to accommodate a plurality of sprockets and/or to accommodate at least one sprocket cluster. For example, 7, 8, 9, 10 or 11 or more sprockets or toothed gears may be non-rotatably accommodated on the rotor. The sprockets may be mounted individually and/or as a toothed gear cluster.

Preferably, the bicycle component furthermore comprises a freewheel device having two interacting freewheel components namely, a hub-side freewheel component and a rotor-side freewheel component. The two freewheel components each comprise axial engagement components for intermeshing with one another. The hub-side freewheel component is non-rotatably connected with the hub shell. The rotor-side freewheel component is non-rotatably connected with the rotor and is movable in the axial direction relative to the rotor and the hub shell at least between a freewheel position and an engagement position. At least one of the freewheel components is part of a freewheel unit as it has been described above.

In such a configuration the bicycle component is, in particular configured as a hub and comprises a freewheel device and at least one freewheel unit as it has been defined above. It is also possible for the freewheel device to comprise two similar or identical, interacting freewheel units.

In preferred configurations, the hub-side freewheel component differs in configuration from the rotor-side freewheel component.

The hub-side freewheel component is preferably connected with the hub shell through a multiple thread showing at least two separate, axially spaced-apart thread grooves. This means that a thread connection between the hub-side freewheel component and the hub shell is provided with at least two separate, axially spaced-apart thread grooves. The hub-side freewheel component is, in particular provided with at least two separate, axially spaced apart thread grooves which are screwed into the hub shell by means of fitting (shape and in particular number) thread grooves. This construction enables an increased thread groove gradient. The gradient angle is larger and thus the axial force effective in the screwed state is lower. Thus, the pressure acting on the hub shell is lower. It is possible to provide the hub-side freewheel component and the hub shell with different numbers of thread grooves as long as the shape and configuration of the thread grooves match. For example, the hub-side freewheel component may show a multiple external thread having two thread grooves and e.g. one circumferential (rectangular) groove so as to provide three circumferential structures. This structure screws into an internal thread having three thread grooves even though only two of the thread grooves engage, providing stability.

In all the configurations, it is preferred for at least one thread groove to show a gradient of at least 1.8 mm or 2.0 mm or at least 2.5 mm and in particular at least 3 mm, and preferably at least 3.5 mm or 4 mm or 5 mm or 6 mm or more. The gradient is in particular larger than is the number of thread grooves multiplied by 1.0 mm and preferably 1.5 mm. Consequently, given two thread grooves the gradient is preferably larger than 2 mm (3 mm) and given three thread grooves, preferably larger than 3 mm (4.5 mm).

Given a gradient that is larger (e.g. 1.5 mm or 2 mm) than in the prior art (e.g. 1 mm), one can still insert a finer thread so as to provide a still better guide for the thread ring respectively the hub-side freewheel component in the hub shell. This allows enhanced centering of the freewheel component. Moreover, the axial forces are lower due to the changed geometric conditions.

In operation, the driving torque urges the hub-side freewheel component in the screwing direction such that the drive forces result in increasing pressure on the hub shell and within the hub shell. For reasons of weight, however, the hub shell is as a rule made of a lightweight material. Moreover, the wall thicknesses are reduced as much as possible to decrease the weight and aerodynamic drag (smaller cross-sectional area).

These two factors result in possible local deformation of the prior art hub shell due to the occurring loads. In the case of defective or too narrow dimensions, high loads may result in breaks of the prior art hub shell which in turn results in high injury potential. The alternative of a stronger material leads to increased weight or noticeably higher costs.

This construction offers a considerable advantage since the acting axial forces are noticeably reduced. A double-pitch (or triple-pitch) or n-pitch thread doubles (triples) the gradient angle or multiplies it by "n" while the pitch remains unchanged. Overall, the forces acting axially inwardly into the hub shell (or another housing or shell) in the axial direction are considerably lower so that no hub shell deformation or at least noticeably reduced deformation occurs. The wall thickness may be reduced while concurrently increasing safety. The forces deforming the bearing seat are smaller. This achieves enhanced riding properties given high loads.

The self-retention is reduced which is again advantageous as regards loads. The self-retention of the thread is still sufficient though.

Autonomous detaching need not be feared. Moreover, detaching is considerably simpler when removing or exchanging a hub-side freewheel component.

The hub-side freewheel component preferably provides for defined accommodation of rolling members to support the hub shell relative to the hub axle.

In particular, is a bearing seat configured in the hub-side freewheel component for defined accommodation of a roller bearing to support the hub shell. Then, the hub-side freewheel component is non-rotatably, and in the axial direction fixedly, connected with the hub shell.

Then, however, the rotor-side freewheel component is non-rotatably and axially movably accommodated in the rotor.

Preferably, a non-round inner contour is configured in the rotor which allows non-rotatable accommodation and axial displaceability of the rotor-side freewheel component. Preferably, the non-round inner contour is followed by an undercut in which a ring may be received for centering the support unit. A centering ring for the support unit may be omitted, e.g. if the components of the assembly sufficiently support one another and if the completely assembled freewheel unit may be inserted centered.

It is particularly preferred for an attachment portion and a centering portion to be configured in the hub shell. An attachment region and a centering region are preferably configured on the hub-side freewheel component. Particularly preferably, the attachment region is screwed to the attachment portion and the centering region is centered at the centering portion. This ensures centering of the hub-side freewheel component in the accommodation in the hub shell. The reproducibility increases considerably, in particular if a bearing seat is configured and a roller bearing is accommodated in the hub-side freewheel component.

Preferably a radial tolerance between the hub-side freewheel component and the hub shell is larger in the attachment portion than in the centering portion. The centering portion and the centering region preferably show a free fit of preferably less than 20 µm or less than 5 µm tolerance. The centering portion and the centering region form in particular a transition fit or interference fit.

In particularly preferred configurations, the attachment portion and the attachment area are each provided with two, three or more thread grooves for a screwed connection. The thread grooves run in particular in parallel and adjacent to one another. A screwed connection by way of a multiple thread offers considerable advantages.

Preferably, the attachment area shows a multiple external thread having thread grooves which screw into the thread grooves of a multiple internal thread screwed into the attachment portion of the hub shell.

Particularly preferably, the hub-side freewheel component comprises an axial body section having an inner central receiving space and a bearing seat formed thereat, and a roller bearing received thereat to rotatably support the hub shell.

Preferably, the front face of the axial body section is provided with a stopper which in the mounted state rests against a radial shoulder of the hub shell.

In a preferred specific embodiment, the hub-side freewheel component comprises an annular flange projecting inwardly, wherein the engagement components are configured on the axially outside surface of the annular flange.

In the hub shell, a radial shoulder is preferably formed for defined axial alignment of the roller bearing accommodated in the hub-side freewheel component.

Preferably, a free distance is formed between the roller bearing accommodated in the hub-side freewheel component and the axially inside surface of the annular flange.

In all the configurations, it is possible for the spring unit of the freewheel unit to comprise not exactly one spring, but e.g. two springs configured as concentric coil springs and/or zigzag springs and extending around the respective central axis. It is also possible for the spring unit to be configured as, or to comprise, an elastic spring sleeve extending around the central axis. The spring unit may extend completely, 360° around the central axis.

Alternatively, it is possible for the spring unit to integrally extend by a smaller angle around the central axis, for example 330° or 300°, at any rate more than 180° and in particular more than 270°.

The non-round outer contour of the freewheel component of the freewheel unit is in particular configured for non-rotatable and axially displaceable accommodation in a drive component of a bicycle.

BRIEF DESCRIPTION OF THE DRAWINGS

Further advantages and features of the present invention can be taken from the exemplary embodiments which will be discussed below with reference to the enclosed figures.

The figures show in.

DETAILED DESCRIPTION

Figure 1:
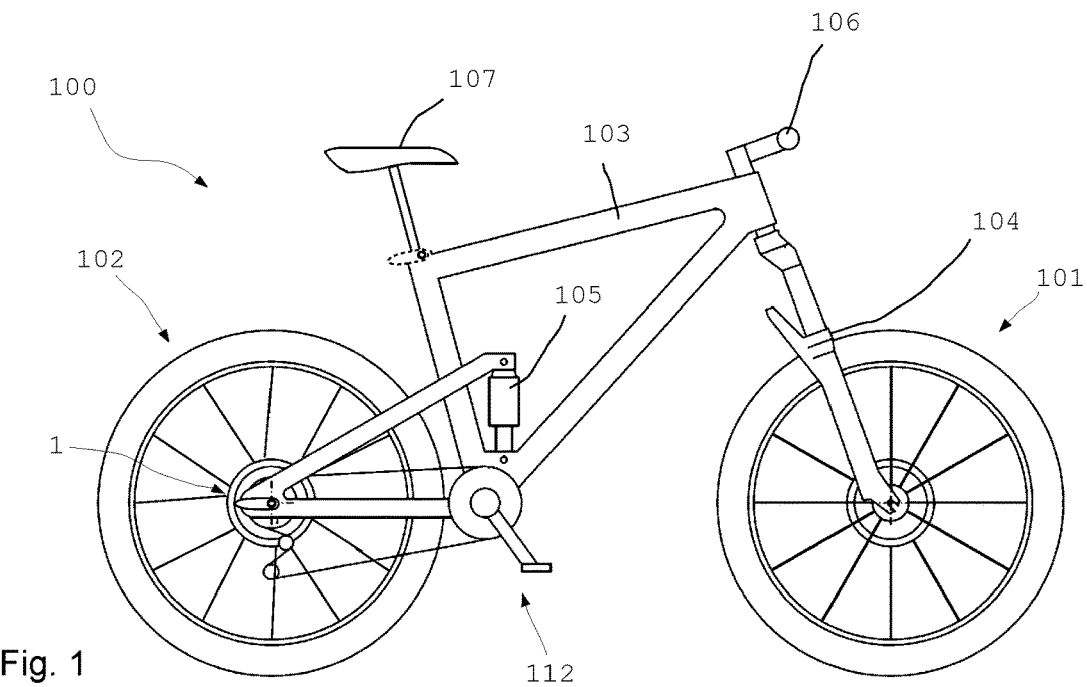
FIG. 1 a schematic illustration of a mountain bike.
Figure 2:
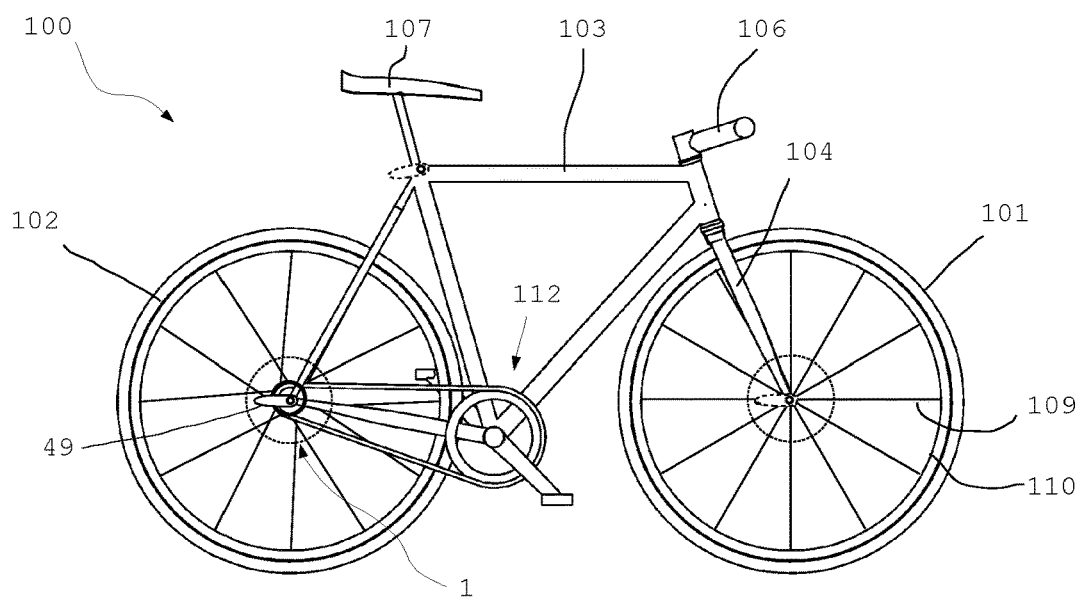
FIG. 2 a schematic illustration of a racing bicycle.

The FIGS. 1 and 2 illustrate a mountain bike or racing bicycle 100 respectively each of which is equipped with bicycle components 80 according to the invention. The racing bicycle and the mountain bike each comprise a front wheel 101 and a rear wheel 102 equipped with hubs 1. The two wheels 101, 102 are provided with spokes 109 and a rim 110. Conventional caliper brakes or other brakes such as disk brakes may be provided.

A bicycle 100 comprises a frame 103, a handlebar 106, a saddle 107, a fork or suspension fork 104 and in the case of the mountain bike, a rear wheel damper 105 may be provided. A pedal crank 112 with pedals serves as a drive. Optionally, the pedal crank 112 and/or the wheels may be provided with an electrical auxiliary drive. The hubs 1 of the wheels may be attached to the frame by means of a through axle or a quick release 49.

With reference to the FIGS. 3 to 11, a hub 1 according to a first exemplary embodiment will be discussed.

Figures 3, 4:
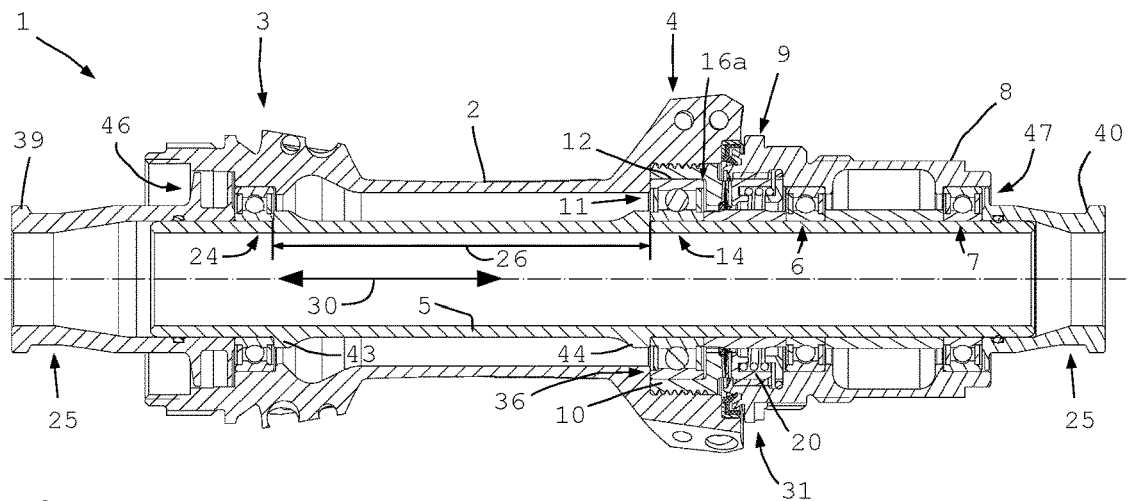
FIG. 3 a section of a hub.
FIG. 4 an enlarged detail of the section in FIG. 3.

FIG. 3 shows in a section the hubs 1 inserted in the rear wheels 102 in the bicycles according to FIGS. 1 and 2, while FIG. 4 illustrates an enlarged detail from FIG. 3.

The hub 1 representing the bicycle component according to the invention comprises a hub shell 2 which is rotatably supported in the axial end regions 3 and 4 by means of the roller bearings 24 respectively 14 to be rotatable relative to, and presently immediately on, a hub axle 5. This means that the roller bearings 14, 24 are each directly disposed on the hub axle 5.

The hub 1 furthermore comprises a rotor 8 on which to dispose at least one sprocket. In particular, a sprocket cluster may be pushed on and attached or arranged. A freewheel device 9 including two freewheel components 10, 20 is provided between the rotor 8 and the hub shell 2. The hub-side freewheel component 10 and the rotor-side freewheel component 20 are comprised. The rotor-side freewheel component 20 is part of a freewheel unit 81 which is configured as a simple bicycle component 80 according to the invention.

To prevent entry of water and dust into the interior of the hub 1, and in particular admission of water and dust to the freewheel device 9, a sealing device 38 is configured between the rotor 8 and the hub shell 2 comprising a labyrinth-like sealing gap and a downstream lip seal contacting the rotor 8 and reliably protecting the freewheel 9 from entry of dirt and water.

Limit stops 39 and 40 are pushed onto the two ends of the hub axle which—while the wheel equipped therewith is not clamped in the frame—are secured on the hub axle by way of O-rings 48. The limit stops 39 and 40 are each provided with a sealing flange 46 or 47 protecting the ends of the hub 1 from entry of dirt and water. This rotor-side limit stop 40 is provided with a radial sealing flange 47, while the other limit stop 39 is provided with a double flange 46 consisting of a pair of circumferential radial sealing flanges between which an axial distance and free space is formed.

The two limit stops 39 and 40 are each provided with a taper 25 which serves for a grasping recess and simplifies pulling a limit stop 39, 40 off of the axis 5 after removing a wheel.

The roller bearings 14, 24 for rotatably supporting the hub shell 2 rest on radial shoulders of bulges 43, 44 of the hub axle 5. The bulges 43 and 44 are each located axially inwardly of the (hub shell) bearings 14, 24.

In all the configurations of the hub 1, the bulges 43, 44 preferably show a somewhat larger radial wall thickness of the hub axle 5. In particular, is the radial wall thickness in the region between about 1.5 times and three times the radial wall thickness in the other regions. Other than the bulges 43, 44 the hub axle 5 is substantially a hollow cylinder in configuration and shows differences in the wall thickness of preferably less than 20%, and in particular less than 15% or less than 10% or less than 5% or less than 2%. Preferably, the relation of the maximum outer diameter of the hub axle (including bulge) to the minimum inner diameter of the hub axle is less than 2.0, and in particular less than 1.75 and preferably less than 1.6. Preferably, the relation of the maximum outer diameter of the hub axle to the minimum inner diameter of the hub axle is larger than 1.25, and in particular larger than 1.4. Preferably, the inner through hole of the hub axle is cylindrical in configuration and comprises a constant clear inner diameter over at least a substantial portion of the length or over the entire length.

The rotor 8 is supported on the axle 5, rotatable via two rotor bearings 6 and 7 and in this case directly.

The roller bearing 14 is accommodated inwardly of the hub-side freewheel component 10 in a central receiving space 11 in a defined location on a bearing seat 12. This allows saving of considerable axial mounting space, so that the stability and rigidity of the hub can be increased. Moreover, the total weight of the hub 1 is considerably reduced. Both the weight of each of the freewheel components and the weight of the hub shell can be reduced since the wall thickness in the rotor-side end region 4 of the hub shell 2 can be reduced.

FIG. 4 shows an enlarged detail from FIG. 3, with the freewheel device 9 once again shown in the engaging position 31, in which the engagement elements 33, designed in particular as axial toothings (see FIG. 7), of the freewheel component 10 and the freewheel component 20 are in non-rotatable engagement with one another. The engagement components 33 are configured such that given a rotational direction in the driving direction a rotational force is reliably transmitted to the hub shell while given an opposite rotational direction the freewheel component 20 is urged axially outwardly counter to the biasing force of the spring unit 32 until the engagement components 33 disengage so as to enable a rotation of the rotor relative to the hub shell. The rotor-side freewheel component 20 is provided with a tubular body section 23 showing a non-round outer contour 21. The non-round outer contour 21 meshes with a matching, non-round inner contour 37 in the rotor 8, and is axially displaceable in parallel to the axial direction of the central axis or axis of symmetry 30 in the rotor 8.

The hub-side freewheel component 10 shows in radial cross-section an approximately L-shaped configuration, where an axial and tubular body section 13 has a multiple external thread 10c in an attachment area 10a that screws into an internal thread 2c in the attachment portion 2a in the hub shell, so that the freewheel component 10 is axially fixedly, and in the driving direction non-rotatably, connected with the hub shell 2. The small detail on the bottom left in FIG. 4 shows the two thread grooves 2e and 2f or 10e and 10f of the multiple thread 2c respectively 10c in the hub shell 2 respectively the hub-side freewheel component 10.

The centering portion 2b in which the centering area 10b of the hub-side freewheel component 10 is received in a close fit serves for defined radial positioning of the hub-side freewheel component 10 and the roller bearing 14 accommodated therein. In particular, is the fit nearly without play. An interference fit may be provided so that the hub-side freewheel component 10 is pressed into the hub shell 2 during screwing in.

A cylindrical bearing seat 12 is formed radially inwardly of the axial body section 13, where the rotor-side roller bearing 14 is accommodated to rotatably support the hub shell 2. When the roller bearing 14 is mounted, it is form-fittingly accommodated with its inner ring 61 in the axial direction between the bulge 44 and the sleeve body 41.

The force-fit in the axial direction 30 is effected from the limit stop 40 via the inner ring of the rotor bearing 7, the sleeve body 42, the inner ring of the rotor bearing 6, the sleeve body 41, the inner ring of the roller bearing 14 and it is then introduced via the radial bulge 44 into the hub axle 5, from where it is transmitted via the radial bulge 43 to the inner ring of the roller bearing 24 from where the clamping force is ultimately dissipated via the limit stop 39.

In the mounted state, the inner end of the hub-side freewheel component rests against a radial shoulder 36 within the hub shell 2. In the mounted state, the outer ring 60 of the roller bearing 14 also rests against this shoulder 36.

The roller bearing 14 shows a free distance 16a from the inside surface of the annular flange 18 of the hub-side freewheel component 10.

The roller bearings 14, 24 and the rotor bearings 6, 7 are preferably each provided with a sealing unit 57 for sealing the roller bearing. The roller bearings 14, 24 and the rotor bearings 6, 7 each comprise rolling members 53.

The multiple thread connection between the hub shell and the hub-side freewheel component 10 exerts less axial forces on the hub shell than does a single-thread screwed connection showing the same pitch. The reason is that the gradient angle of the thread groove is considerably larger so that smaller axial forces result. Disassembly is also facilitated since self-retention is lower. Due to the lower axial forces the hub shell is subjected to lower loads. The wall thicknesses can be reduced while durability is increased.

The rotor-side freewheel component 20 comprises on its front face 22 a rotor-side annular flange 28 on which the engagement components 33 are configured. The rotor-side annular flange 28 is in particular configured integrally with the tubular body section 23.

This construction allows a noticeably increase in the distance 26 between the roller bearings 14, 24 for supporting the hub shell. The distance 27 between the rotor bearings 6 and 7 can likewise be clearly increased. This increases the stability and rigidity of the hub 1 on the whole.

The enlarged detail on the top right in FIG. 4 shows a section of the freewheel unit 81 and the sleeve body 41 disposed on the hub axle. The freewheel unit 81 is configured as a preassembled assembly 83 and comprises the freewheel component 20, a spring unit 32 acting as a biasing device and a support unit 84. The spring unit 32 presently configured as a coil spring extends around the circumference of the central axis 30 by means of the spring body. This results in a large-diameter coil spring. At one of the coil ends, the spring unit 32 is fixedly connected with the freewheel component 20 secure against loss and at the other of the ends, the coil spring 32 is fixedly connected with the support unit 84 secure against loss. This coil spring is coupled with the freewheel component 20 respectively the support unit 84 in a force-fit. The connecting force is sufficient so as to reliably preserve the assembly during mounting, and preferably in normal operation, and also during demounting and to prevent it from falling apart while on the other hand allowing manual demounting.

This freewheel component 20 shows an approximately L-shaped configuration in radial cross-section. The long leg of the "L" is formed by the tubular body section 23. The short leg of the "L", presently facing radially inwardly, is formed by the front face 22 of the freewheel component 20. The front face is provided with the engagement components 33. A takeup tab 86 is disposed axially rearwardly on the annular flange 18 which provides on its front the front face 22, and in this case is in particular configured as a circumferential takeup flange 86. The takeup flange 86 extends from the axially inside surface of the annular flange (also denoted front flange) sleeve-like rearwardly. The sleeve-like body extends approximately concentric to the tubular body section 23. The takeup flange 86 may be cylindrical but it may show conical sections to e.g. facilitate pushing on or to ensure a better hold.

An accommodation section 82 for fastening the spring unit 32 is provided on the radially outside surface of the circumferential takeup flange 86. The spring unit 32 is pushed with a coil end or coil portion onto the takeup flange 86, where it is retained in a force fit. For better gripping, the front end of the spring unit 32 may be bent radially inwardly or outwardly to achieve a firmer grip on the takeup flange 86. To this end, a length of 2 to 5 mm may be slightly bent over at the coil end.

On the radially outside surface and/or inside surface of the circumferential takeup flange 86, a circumferential depression may be configured which serves for form-fit accommodation of the end of the spring unit 32.

At the front end, the spring unit 32 is typically supported over at least part of the circumference on the inside surface (supporting surface) 22a of the annular flange 18.

At the other end of the spring unit 32, at least part of a coil 32a or at least a coil end 32b is supported on the support unit 84 which comprises a support disk 88 and a support tab 89. The support tab 89 may be configured as a circumferential support flange. On the radially outside surface, at least one coil portion of the spring unit 32 rests against the support tab respectively the support flange 89 in a force fit and/or form fit. Clamping can be achieved by way of the diameter of the spring unit 32 being slightly smaller than the outer diameter of the support flange prior to mounting.

Alternatively, it is possible for the end of the coil to be slightly bent radially inwardly to achieve better clamping. It is also possible for the support flange to show a (an at least partially) circumferential depression in which the end of the spring unit 32 is received in a form fit.

The support unit rests, for example, on a radial shoulder 35 in the rotor 8 on the axially outside surface to enable reliable dissipation of the forces occurring. When manufacturing the rotor and forming the non-round inner contour 37 of the rotor, which enables a non-rotatable accommodation and axial displaceability of the rotor-side freewheel component 20, an undercut in the shape of a groove 91 is as a rule inserted. The groove 91 axially follows the non-round inner contour 37 and is finally delimited by the shoulder 35. A ring 92 for centering the support unit 84 may be received in the groove 91 as is shown in the bottom half of FIG. 4. The ring 92 may contribute to cause or assist with centering of the freewheel unit 81 in mounting. In many cases, such a ring 92 may be dispensed with since the assembly 83 is self-centering due to the non-round outer contour 21 in the non-round inner contour 37.

Figure 5:
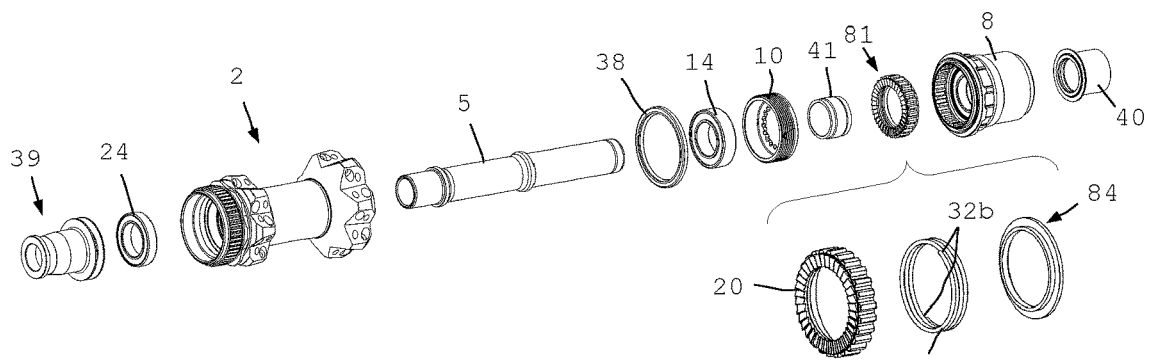
FIG. 5 an exploded view of the hub according to FIG. 3
FIG. 6 a freewheel unit of the hub according to FIG. 3.

FIG. 5 shows a perspective exploded view of the components of the hub 1. The limit stop 39 is formed at the left end. To the right follow the roller bearing 24 for supporting the hub shell 2 and the hub axle 5. Then, follow the sealing device 38 for sealing between the hub shell and the rotor, the roller bearing 14, the hub-side freewheel component 10, the sleeve body 41, the freewheel unit 81 and the rotor 8, and the rotor-side limit stop 40.

The components of the freewheel unit 81 which together form the assembly 83 are shown enlarged beneath. The freewheel unit 81 consists of the freewheel component 20, the spring unit 32 the coil ends 32a of which can be recognized, and the support unit 84, which when assembled result in a preassembled assembly 83 which is inserted into the hub as a whole in mounting.

Figure 6:
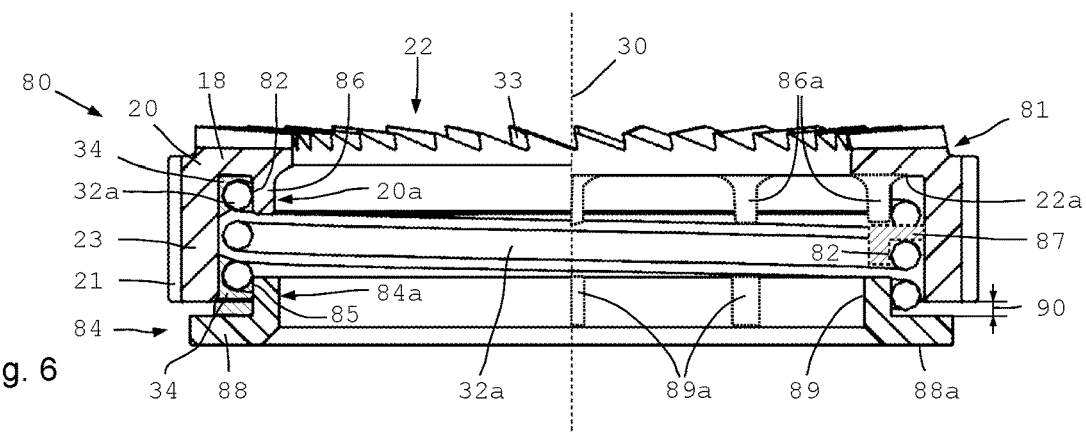

FIG. 6 shows a cross-section of a freewheel unit 81 as the bicycle component 80. On the right and left of the central axis 30, slightly different versions of the freewheel unit 81 are illustrated.

At any rate, the freewheel unit 81 comprises a freewheel component 20, a spring unit 32 and a support unit 84, combined to form an assembly 83. The spring unit 32 is fastened to a first end on an accommodation section 82 of the freewheel component 20. The accommodation section 82 may be configured on a circumferential takeup flange 86.

It is also possible for the accommodation section 82 to consist of multiple part sections configured on individual takeup tabs 86 which are disposed over the circumference of the freewheel component 20. Takeup tabs or accommodating members 86 may, for example, be present in specific angular sections. Individual accommodating members 86a are shown on the right half in FIG. 6, while the left half of FIG. 6 indicates a circumferential takeup flange 86.

It is also possible for a takeup tab or a circumferential takeup flange to be configured on a separate annular wall 87 disposed in parallel to, and spaced apart from, the front face 22. Instead of the annular flange 18, this annular wall 87 may serve to support and to attach the spring unit 32 secure against loss.

It is likewise possible for a circumferential support flange 89 to provide a circumferential support section 85 on the support unit 84, as is indicated in the left half of FIG. 6.

The right half of FIG. 6 illustrates support members or support tabs 89 which combined provide such a support section 85.

Various combinations of individual components and circumferential flanges are possible.

FIG. 6 also shows the maximum stroke length 90 by which the freewheel unit can be compressed in the axial direction 30 before the freewheel component 20 and the support unit 84 go into lockout. In the exemplary embodiment, the stroke length 90 in the installed and thus biased state is less than 2 mm and depending on the number and configuration of the engagement components 33, it may be larger or smaller. The required axial movement for bringing the engagement components 33 from the engagement to the freewheel position is presently less than 1 mm. In the preassembled but not yet assembled state, a stroke length of 4 mm, 5 mm, 6 mm, or even 10 mm or 12 mm or more is possible.

The back face of the support unit 84 shows an abutting face 88a by means of which the freewheel unit 20 rests on the shoulder 35 in the rotor. This achieves exactly defined conditions.

As a rule, the spring unit 32 stays on the freewheel component 20 without any further means due to the matching dimensions.

Alternatively, it may be planned or unintended in the case of unfavorable tolerances, that the spring unit 32 does not adhere unassisted to the freewheel component 20. In these cases, the end of the spring unit 32 may be fastened or "stuck on" by means of some lubricant 34 e.g. prior to mounting following maintenance or when first mounting.

The lubricant 34 such as grease or the like may be fed in, e.g. locally (preferably over at least one section) in the circumferential groove between the takeup flange 86 and the inner wall 23a of the tubular body section 23.

A suitable quantity of lubricant 34 may also be applied to the support unit 84 to connect the spring unit with, or fasten it to, the support unit on its other end. It is also possible to apply a suitable quantity of lubricant 34 (only) to one end or to both ends of the spring unit.

The lubricant 34 is exemplarily shown in hachure in FIG. 6 on the two ends of the spring unit. Then, the spring unit 32 adheres to the freewheel component and/or the support unit by way of the lubricant sufficiently securely for mounting. At least for mounting, there will be a modular unit the individual parts of which are sufficiently firmly connected with one another.

The support unit shows a safety device 84a extending axially in the direction of the freewheel component and the freewheel component shows a protective device extending axially in the direction of the support unit, each so as to prevent an end of the spring unit from side-slipping inwardly. Otherwise, the axially outwardly end of the spring unit 32 could come to rest on the seal 57 at the rotor bearings 6 from FIG. 3. This would apply pressure on the rolling members and impede the sealing and the other functions. The safety device 84a shown is configured as a support flange 89 or comprises multiple support members 89a.

The protective device 20a at the freewheel component 20 comprises a takeup flange 86 or multiple accommodating members 86a preventing the spring unit 32 from side-slipping inwardly at its other end.

The protective device 20a and a safety device each extend over an axial length that is larger than half the diameter, and preferably larger than the diameter of the body of a coil 32a of the spring unit 32.

Figure 7:
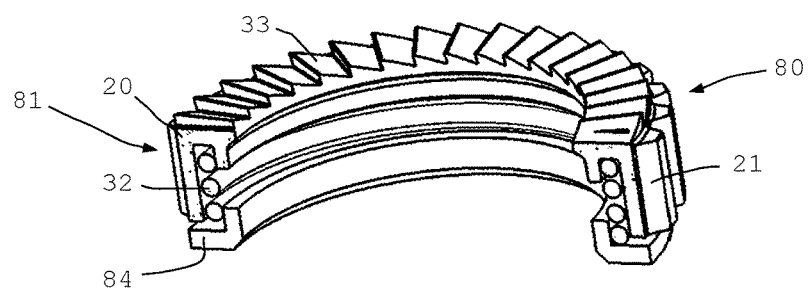
FIG. 7 a perspective sectional view of the freewheel unit according to FIG. 6.

FIG. 7 shows a sectional perspective view of the freewheel unit 81 in which the compact structure is illustrated. The entire freewheel unit 81 is only slightly longer in the axial direction than the freewheel component 20 with the axial toothing.

In all the configurations, the ratio of the axial length of a freewheel unit 81 to the axial length of a freewheel component of the freewheel unit in the mounted state in a hub 1 is preferably less than 3:2, and in particular less than 4:3, and particularly preferably less than 5:4 or less than 6:5. This is advantageous since the freewheel component needs a certain length for axial guiding and on the other hand a shorter overall length enables improved support of a hub.

Figure 8:
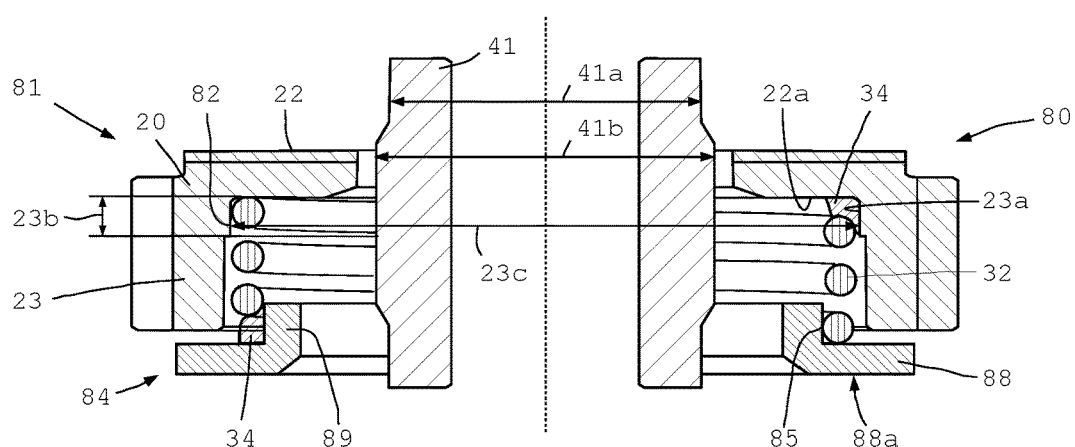
FIG. 8 another freewheel unit for a hub according to FIG. 3.

FIG. 8 shows another configuration of a freewheel unit 81 in a schematic cross-section. The freewheel unit 81 in turn is provided with a freewheel component 20 and a spring unit 32 configured as a coil spring and also a support unit 84. One of the ends of the spring unit 32 is received on the freewheel component 20 in a force fit and the other of the ends, connected with the support unit 84 in a force fit so as to provide a preassembled assembly 83.

A part of a coil 32 of the spring unit 32 is clamped to a longitudinal section 23b on the inner wall 23a of the tubular body section 23 of the freewheel component 20. This accommodation section 82 is provided by the inner wall 23a in the longitudinal section 23b having a slightly smaller inner diameter 23c.

Additionally, the sleeve body 41 is shown which is located radially inwardly of the freewheel unit 81 including in the completely assembled state of a hub 1. The sleeve body 41 shows two diameter sections with the diameters 41a and 41b. At the ends, the wall thicknesses are slightly less for saving weight. In the central region the wall thickness is slightly larger.

In FIG. 8 a quantity of lubricant 34 is again shown in hachure on the freewheel component 20 and the support unit 84 which can be suitably applied if the individual components do not per se stick together such as e.g. due to less than optimal tolerances in a particular case. A suitable quantity of lubricant 34 in suitable spots results in an assembly 83 sticking sufficiently together at least for mounting so as to ensure reproducible mounting.

Figure 9:
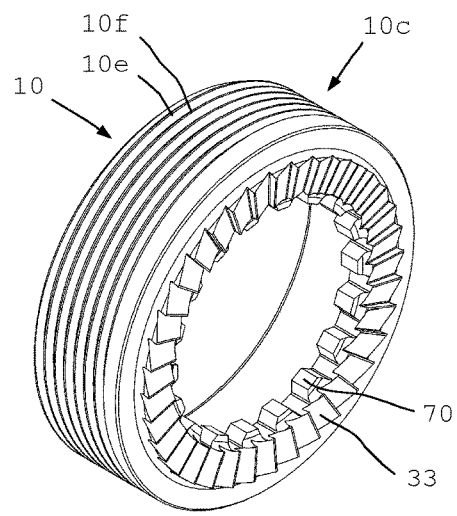
FIG. 9 a hub-side freewheel component of the hub according to FIG. 3.

FIG. 9 shows a perspective illustration of the hub-side freewheel component 10 provided with multiple external threads 10c having two thread grooves 10e and 10f with which to screw the freewheel component 10 into the hub shell 10. The front face shows the axial engagement components 33. A radially inwardly inner contour 70 is shown serving to demount the hub-side freewheel component 10 to enable unscrewing the hub-side freewheel component 10 from the hub shell 2. A tool contour 70 is preferably configured in all the configurations and exemplary embodiments. The tool contour 70 may show different shapes, for example the contour shown. Otherwise an inner polygon or suitable depressions are conceivable.

Figure 10:
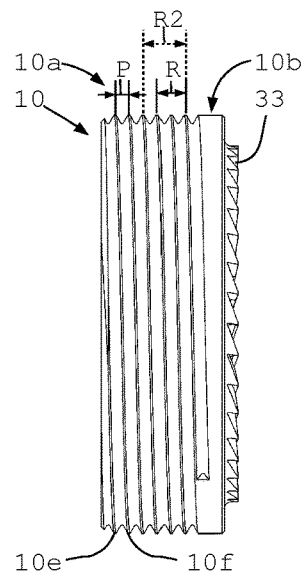
FIG. 10 a side view of the hub-side freewheel component according to FIG. 9.

FIG. 10 shows a side view of the hub-side freewheel component 10 wherein the attachment region 10a with the multiple thread and the centering region 10b can be identified. In the attachment region 10a, the multiple thread with the pitch P and the gradient R is illustrated. Each of the thread grooves 10e and 10f can be identified.

Figure 11:
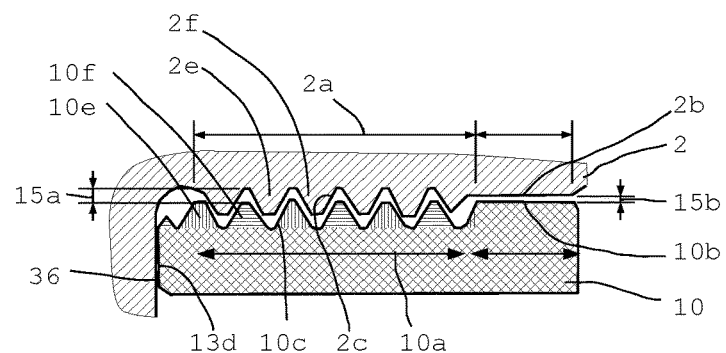
FIG. 11 a schematic diagrammatic drawing of a detail from FIG. 3.

FIG. 11 shows a schematic cross-section with the screwed connection of the hub-side freewheel component 10 with the hub shell 2 shown simplistically and enlarged. One can identify the individual threads 2e, 2f, and 10e and 10f in the hub shell, respectively the hub-side freewheel component 10 and the length of the attachment portion 2a respectively attachment region 10a, and the corresponding length of the centering portion 2b and the centering region 10b. In the centering portion 2b, the tolerance 15a is considerably smaller than the tolerance 15b in the attachment portion 2a.

At the axially inwardly end, the front end 13d of the axial body section 13 abuts against the radial shoulder 36 in the hub shell 2 so as to obtain a defined seat of the hub-side freewheel component 10.

Figure 12:
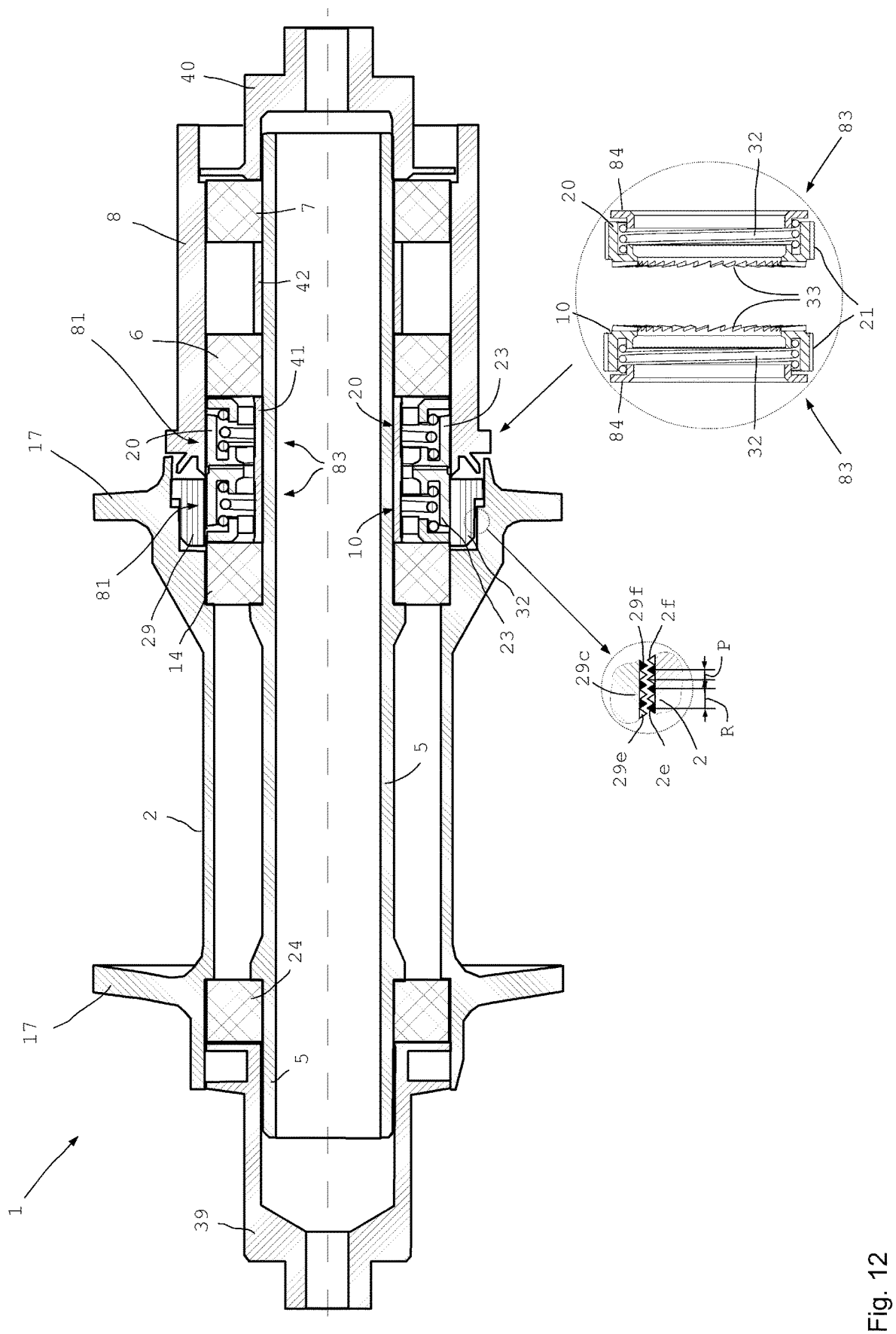
FIG. 12 another hub in a simplistic cross-section.

FIG. 12 shows another exemplary embodiment of a hub 1 comprising two identical freewheel units 81.

The hub 1 illustrated in a schematic cross-section comprises a hub shell 2 and a hub axle 5 on the ends of which limit stops 39 and 40 are pushed. Roller bearings 24 and 14 serve to rotatably support the hub shell and rotor bearings 6 and 7 are employed to rotatably support the rotor. All of these bearings are configured as roller bearings. The axial distance of the hub bearings 14 and 24 ensues from the shoulders on the radial bulges on the hub axle 5. A sleeve body 42 is disposed between the rotor bearings 6 and 7, and a sleeve body 41 is disposed between the rotor bearing 6 and the rotor-side hub bearing 14.

Spoke flanges 17 serve to attach spokes.

This freewheel device 9 comprises 2 identical freewheel units 81. Each freewheel unit 81 comprises a freewheel component 10 respectively 20, a spring unit 32 and a support unit 84.

The spring unit 32 is fastened to the freewheel component 10 and 20 and to the support unit 84 with its respective ends so as to result in a preassembled assembly 83 each.

The preassembly of the assembly 83 allows to enhance the quantity already when the hubs 1 are first mounted. Moreover, increased reproducibility and quality is enabled in later demounting and subsequent re-mounting.

The floating mounting of the two axial toothings 33 allows achievement of particular flexibility in adapting the freewheel device 9.

The hub-side freewheel component 10 is accommodated non-rotatably and axially displaceably in the threaded ring 29 that is screwed into the hub shell. The enlarged detail on the bottom left shows the screw-connected multiple threads 29c and 2c. The threaded ring 29 shows the thread grooves 29e and 29f of the presently double external thread screwed to the thread grooves 2e and 2f of the hub shell 2. Again, a lower axial force acts on the hub shell 2 than when using a single thread.

The rotor-side freewheel component 20 is non-rotatably and axially displaceably accommodated in the rotor 8. To this end, the threaded ring 29 and the rotor 8, or the freewheel components 10 and 20 each show a matching non-round outer contour 21 and inner contour 37.

In all the configurations, a freewheel unit 81 provides a clearly defined support on both sides. Due to the configuration and fixing the connections hardly change at all in operation or only slightly. Absent fixing to the spring unit, a conventional freewheel shows changes to the pertaining supporting surfaces in operation due to changing roughness or wear. Such changes are undefined. A freewheel unit 81 according to the present invention always provides defined conditions so as to also achieve a longer service life.

The large diameter spring unit allows reliable and sufficiently strong biasing. A circumferential spring unit offers considerable advantages since it always responds precisely over the entire circumference.

In all the configurations, the hub allows increased lateral stiffness, an increased bending stiffness, and a still safe operation, and easier maintenance. At the same time, the weight may be reduced which is of particular importance in the area of sports and for professional use.

Another advantage is the smaller cross-section of the hub body which is thus aerodynamically better. The quantity of parts is smaller so as to make servicing, assembly and disassembly easier. Manufacturing the hub is also easier.

A considerable advantage is achieved by the multiple threads so as to result in reduced loads on the hub shell and reduced self-retention.

In all the configurations, it is preferred to employ ground inner bearing rings in the roller bearings. A ground outer ring may also be employed so as to obtain very low frictional values.

While a particular embodiment of the present bicycle component for an at least partially muscle powered bicycle has been described herein, it will be appreciated by those skilled in the art that changes and modifications may be made thereto without departing from the invention in its broader aspects and as set forth in the following claims.

| | List of reference numerals: |
|---|---|
| 1 | hub |
| 2 | hub shell |
| 2a | attachment portion |
| 2b | centering portion |
| 2c | internal thread |
| 2e | thread groove |
| 2f | thread groove |
| 3, 4 | end region |
| 5 | hub axle |
| 6, 7 | rotor bearing |
| 8 | rotor |
| 9 | freewheel device |
| 10 | freewheel component |
| 10a | attachment area |
| 10b | centering area |
| 10c | external thread |
| 10e | thread groove |
| 10f | thread groove |
| 11 | receiving space |
| 12 | bearing seat |
| 13 | axial body section |
| 13d | stopper |
| 14 | roller bearing |
| 15a | tolerance, play |
| 15b | tolerance, play |
| 16a | distance |
| 17 | spoke flange |
| 18 | annular flange |
| 20 | freewheel component |
| 20a | protective device |
| 21 | outer contour |
| 22 | front surface, front face |
| 22a | supporting surface |
| 23 | tubular body section |
| 23a | inner wall |
| 23b | longitudinal section |
| 23c | diameter |
| 24 | roller bearing |
| 25 | grasping recess, taper |
| 26 | bearing distance 14, 24 |
| 27 | bearing distance 6, 7 |
| 28 | rotor-side annular flange |
| 29 | threaded ring |
| 29c | multiple external thread |
| 29e | thread groove |
| 29f | thread groove |
| 30 | central axis, axis of symmetry |
| 31 | engagement position |
| 32 | biasing device, spring unit |
| 32a | coil |
| 32b | coil end |
| 33 | engagement components, axial toothing |

-continued

| | List of reference numerals: |
|---|---|
| 34 | lubricant |
| 35 | shoulder in 8 |
| 36 | radial shoulder |
| 37 | inner contour |
| 38 | sealing device |
| 39, 40 | limit stop |
| 41 | sleeve body |
| 41a | diameter |
| 41b | diameter |
| 42 | sleeve body |
| 43, 44 | radial bulges |
| 46 | double flange of 39 |
| 47 | sealing flange of 40 |
| 48 | O-ring |
| 49 | quick release |
| 53 | rolling member |
| 57 | sealing unit |
| 60 | outer ring |
| 61 | inner ring |
| 70 | inner contour |
| 80 | bicycle component |
| 81 | freewheel unit |
| 82 | accommodation section |
| 83 | assembly |
| 84 | support unit |
| 84a | safety device |
| 85 | support section |
| 86 | takeup flange, takeup tab |
| 86a | accommodating member |
| 87 | annular wall |
| 88 | support disk |
| 88a | abutting face |
| 89 | support flange, support tab |
| 89a | support member |
| 90 | stroke length |
| 91 | groove |
| 92 | ring |
| 100 | bicycle |
| 101 | wheel, front wheel |
| 102 | wheel, rear wheel |
| 103 | frame |
| 104 | fork, suspension fork |
| 105 | rear wheel damper |
| 106 | handlebar |
| 107 | saddle |
| 109 | spoke |
| 110 | rim |
| 112 | pedal crank |
| P | pitch |
| R | gradient |

The invention claimed is:

1. A bicycle component for an at least partially muscle-powered bicycle having at least one freewheel unit comprising: a freewheel component, a support unit and at least one spring unit;

the freewheel component comprising a tubular body section extending around a central axis and configured hollow, including a non-round outer contour for non-rotatable and axially displaceable coupling, and a front surface with axial engagement components;

wherein the spring unit urges the freewheel component and the support unit apart in an axial direction of the central axis;

wherein the spring unit is attached to the freewheel component and to the support unit;

wherein an accommodation section is configured on an axial takeup tab, and the takeup tab is tubular in configuration, and forms a takeup flange; and wherein the accommodation section is configured on a radially peripheral surface of the takeup flange.

2. The bicycle component according to claim 1, wherein the freewheel component is configured with at least one accommodation section to which the spring unit is attached.

3. The bicycle component according to claim 1, wherein the support unit is configured with a support section, and wherein the spring unit is attached to the support section.

4. The bicycle component according to claim 1, wherein the freewheel component, the support unit and the spring unit are connected to one another to prevent against seperation.

5. The bicycle component according to claim 1, wherein a stroke length of the spring unit is less than 15 mm, and wherein a diameter of the assembly is larger than 25 mm, and wherein a free axial distance of the support unit from the freewheel component in an unloaded state is less than 6 mm.

6. The bicycle component according to claim 1, wherein the freewheel component comprises a supporting surface transverse to the tubular body section configured for supporting the spring unit.

7. The bicycle component according to claim 6, wherein the supporting surface is configured on an axially inside surface of a front face or at an annular wall spaced apart therefrom.

8. The bicycle component according to claim 1, wherein the accommodation section comprises multiple part sections on a multitude of accommodating members, wherein the accommodating members are in particular configured as separate parts and are accommodated and clamped on the freewheel component.

9. The bicycle component according to claim 1, wherein the accommodation section is configured on an inner wall of the tubular body section in a longitudinal section having a diameter for accommodating the spring unit for radially inwardly clamping.

10. The bicycle component according to claim 1, wherein the accommodation section comprises at least one thread groove for a screwed connection of the spring unit with the freewheel component.

11. The bicycle component according to claim 1, wherein the support unit comprises a support disk and at least one support tab.

12. The bicycle component according to claim 11, wherein the support tab is configured as a support flange and is configured for radially clamping the spring unit.

13. The bicycle component according to claim 11, wherein multiple support members are configured on the support disk.

14. The bicycle component according to claim 1, wherein the spring unit comprises a spring body extending around the central axis.

15. The bicycle component according to claim 1, wherein the spring unit is configured as a coil spring having at least one circumferential coil, or as a zigzag spring.

16. The bicycle component according to claim 15, wherein an outer diameter of the spring unit is larger than 15 mm, and wherein a ratio of the outer diameter of the spring unit to a diameter of the coil is less than 50 and more than 15.

17. The bicycle component according to claim 15, wherein at least one end of the coil of the spring unit is bent one of radially inwardly and outwardly.

18. The bicycle component according to claim 1, wherein a lubricant such as grease at least contributes to fastening the spring unit to at least one of the freewheel component and the support unit.

19. A bicycle component for an at least partially muscle-powered bicycle having at least one freewheel unit comprising: a freewheel component and a support unit and at least one spring unit supported between the support unit and the freewheel component; the freewheel component comprising a tubular body section extending around a central axis and configured hollow, including a non-round outer contour for non-rotatable and axially displaceable coupling, and a front surface with axial engagement components; and the spring unit comprising a spring body and biasing the freewheel component in an axial direction of the central axis; the support unit includes a safety device extending axially in the direction of the freewheel component, and/or the freewheel component includes a protective device extending axially in the direction of the support unit to prevent an end of the spring unit from side-slipping inwardly.

20. The bicycle component according to claim 19, wherein the safety device comprises on the support unit a support flange or support members which prevent an end of the spring unit from side-slipping inwardly.

21. The bicycle component according to claim 20, wherein the spring unit rests on the support flange or the support members.

22. The bicycle component according to claim 19, wherein the protective device comprises on the freewheel component a takeup flange or accommodating members which prevent an end of the spring unit from side-slipping inwardly.

23. The bicycle component according to claim 19, wherein the protective device or a safety device extends over an axial length that is larger than a thickness of a wall of the spring unit.

24. The bicycle component according to claim 19, wherein a groove-shaped receiving space for an end of the spring unit having a U-shaped cross-section is formed between the protective device on the freewheel component and the tubular body section.

25. The bicycle component according to claim 19, wherein a free radial distance is formed between at least one of the protective device and the spring unit and between the safety device and the spring unit.

26. The bicycle component according to claim 1, comprising a hub shell rotatably supported relative to the hub axle, a rotatably supported rotor.

27. The bicycle component according to claim 26, comprising the freewheel device having a second freewheel component interacting with said freewheel component, said interacting freewheel components including, a hub-side freewheel component and a rotor-side freewheel component, wherein the two freewheel components each comprise axial engagement components for intermeshing with one another wherein the hub-side freewheel component is non-rotatably connected with the hub shell, wherein the rotor-side freewheel component is non-rotatably connected with the rotor and is movable in the axial direction relative to the rotor and the hub shell at least between a freewheel position and an engagement position, and wherein at least one of the freewheel components is part of the freewheel unit.

28. The bicycle component according to claim 27, wherein the hub-side freewheel component is connected with the hub shell through a multiple thread having at least two separate and axially spaced apart thread grooves and wherein the hub-side freewheel component provides for defined accommodation of rolling members to support the hub shell relative to the hub axle.

29. The bicycle component according to claim 27, wherein a non-round inner contour is formed in the rotor allowing non-rotatable accommodation and axial displaceability of the rotor-side freewheel component and wherein an undercut follows the non-round inner contour.

30. A bicycle component for an at least partially muscle-powered bicycle having at least one freewheel unit comprising:
- a freewheel component, a support unit and at least one spring unit;
- the freewheel component comprising a tubular body section extending around a central axis and configured hollow, including a non-round outer contour for non-rotatable and axially displaceable coupling, and a front surface with axial engagement components;
- wherein the spring unit urges the freewheel component and the support unit apart in an axial direction of the central axis;
- wherein the spring unit is attached to the freewheel component and to the support unit; and
- wherein the support unit comprises a support disk and at least one support tab.

31. A bicycle component for an at least partially muscle-powered bicycle having at least one freewheel unit comprising:
- a freewheel component, a support unit and at least one spring unit;
- the freewheel component comprising a tubular body section extending around a central axis and configured hollow, including a non-round outer contour for non-rotatable and axially displaceable coupling, and a front surface with axial engagement components;
- wherein the spring unit urges the freewheel component and the support unit apart in an axial direction of the central axis;
- wherein the spring unit is attached to the freewheel and to the support unit;
- wherein the spring unit is configured as a coil spring having at least one circumferential coil, or as a zigzag spring; and
- wherein a lubricant such as grease at least contributes to fastening the spring unit to at least one of the freewheel component and the support unit.

* * * * *